(12) United States Patent
Carrington (10) Patent No.: US 11,444,568 B2
(45) Date of Patent: Sep. 13, 2022

(54) SHIPPING CONTAINER SOLAR PANEL SYSTEM

(71) Applicant: Scott Carrington, Calgary (CA)

(72) Inventor: Scott Carrington, Calgary (CA)

( * ) Notice: Subject to any disclaimer, the term of this patent is extended or adjusted under 35 U.S.C. 154(b) by 124 days.

(21) Appl. No.: 16/899,419

(22) Filed: Jun. 11, 2020

(65) Prior Publication Data

US 2020/0304056 A1    Sep. 24, 2020

Related U.S. Application Data

(63) Continuation of application No. 15/908,468, filed on Feb. 28, 2018, now Pat. No. 10,727,778.

(51) Int. Cl.
*H02S 10/40* (2014.01)
*H02S 20/30* (2014.01)
*H02S 30/20* (2014.01)

(52) U.S. Cl.
CPC ............. *H02S 10/40* (2014.12); *H02S 20/30* (2014.12); *H02S 30/20* (2014.12)

(58) Field of Classification Search
None
See application file for complete search history.

(56) References Cited

U.S. PATENT DOCUMENTS

2015/0162865 A1\* 6/2015 Cowham ................. F24S 25/70
136/251

\* cited by examiner

*Primary Examiner* — Shannon M Gardner
(74) *Attorney, Agent, or Firm* — Richard D. Okimaw (57) ABSTRACT

An apparatus for portable power generation comprises an intermodal container having a front bracket and a top bracket secured to a top thereof. At least one front solar panel assembly is hinged to the top bracket, wherein the at least one front solar panel assembly is pivotable between a stored position proximate to and substantially parallel to the front of the intermodal container and an extended position angularly rotated upward about the top bracket to an angle relative to the front of the intermodal container and at least one top solar panel assembly hinged to the top bracket wherein the at least one top solar panel assembly is pivotable between a stored position proximate to and substantially parallel to the top of the intermodal container and an extended position angularly rotated upward about the top bracket to an angle relative to the top of the intermodal container.

17 Claims, 7 Drawing Sheets

SHIPPING CONTAINER SOLAR PANEL SYSTEM

CROSS REFERENCE TO RELATED APPLICATION

This application is a continuation application of U.S. patent application Ser. No. 15/908,468 filed Feb. 28, 2018 entitled Portable Power Generator.

BACKGROUND OF THE INVENTION

1. Field of Invention

The present invention relates generally to portable power generation and in particular to a solar panel apparatus for a standard intermodal container.

2. Description of Related Art

Solar energy is a renewable, environmentally sustainable alternate energy source which can be used at virtually any location. Some remote sites requiring electrical power utilize a solar cell system to produce the required power. Such remote sites also often require shelter to house equipment and to provide a temporary work environment on site.

To provide both shelter and power, standard intermodal containers equipped with solar panel systems have been utilized. WIPO International Publication No. WP 2015/164913 A1, Pyne, describes a portable power station including a solar array secured to an intermodal container. In this prior art, the solar panels are fixed into position on a flat horizontal plane, with some panels cantilevered outwards from the container. Such an arrangement is disadvantageous in environments where there can be snow accumulation on the panels, which will not naturally disengage from a flat surface, and the weight of the snow on the cantilevered panels may result in collapse. As is commonly known in the art, solar panels should be positioned at an angle to capture the maximum amount of sunlight appropriate for the latitude of the location. A horizontal configuration does not take latitude location into account, and thus is not as efficient as possible.

US Patent Application Publication No.'s 2015/0162865 A1, Cowham, and 2016/0285404 A1, Aikens et al., describe an arrangement with a V-shaped solar panel roof structure. This arrangement is also disadvantageous in a snowy climate, with snow accumulating in the "V", blocking the sun's rays from reaching the panels and potentially causing damage to the panels with the weight of the snow.

U.S. Pat. No. 9,612,039 B2, Meppelink et al., utilizes solar panels positioned at an angle. Disadvantageously, the solar panel array width, and thus the potential power output, is limited to the length of the container, with all panels supported by the main body of the container.

SUMMARY OF THE INVENTION

According to one embodiment of the present disclosure is provided an apparatus for portable power generation comprising an intermodal container having a front, a rear, a top and a bottom and extending between first and second ends, said intermodal container having a front bracket and a top bracket secured to a top thereof. The apparatus further includes at least one front solar panel assembly hinged to the top bracket, wherein the at least one front solar panel assembly is pivotable between a stored position proximate to and substantially parallel to the front of the intermodal container and an extended position angularly rotated upward about the top bracket to an angle relative to the front of the intermodal container and at least one top solar panel assembly hinged to the top bracket wherein the at least one top solar panel assembly is pivotable between a stored position proximate to and substantially parallel to the top of the intermodal container and an extended position angularly rotated upward about the top bracket to an angle relative to the top of the intermodal container.

The front solar panel assembly may be supported at the extended position by at least one front support brace. The at least one front support brace may extend between the at least one front solar panel and the front of the intermodal container. The at least one front support brace may extend to a bottom portion of the at least one front solar panel. The at least one front support brace may be secured to the at least one front solar panel by fasteners. The top bracket may extend past the front of the intermodal container.

The top solar panel assembly may be supported at the extended position by at least one top support brace. The at least one top support brace may extend between the at least one top solar panel and the top of the intermodal container. The at least one top support brace may extend to a top portion of the at least one top solar panel. The at least one top support brace may be secured to the at least one top solar panel by fasteners. The at least one front solar panel assembly and the at least one top solar panel assembly may be substantially parallel at the extended position. The top bracket and the front bracket may be co-formed with each other.

According to one embodiment of the present disclosure is provided a method for portable power generation comprising locating an intermodal container at a desired location, pivoting at least one front solar panel assembly about a front bracket secured to a top of the intermodal container into an extended position angular relative to the front of the intermodal container and pivoting at least one top solar panel assembly about a top bracket secured to a top of the intermodal container into an extended position angular relative to the top of the intermodal container.

The extended positions of the at least one front solar panel assembly and the at least one top solar panel assembly may be substantially parallel. The method may further comprise securing the at least one front solar panel assembly at the extended position with at least one front strut extending between the at least one front solar panel assembly and the front of the intermodal container. The method may further comprise securing the at least one top solar panel assembly at the extended position with at least one top strut extending between the at least one top solar panel assembly and the top of the intermodal container.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
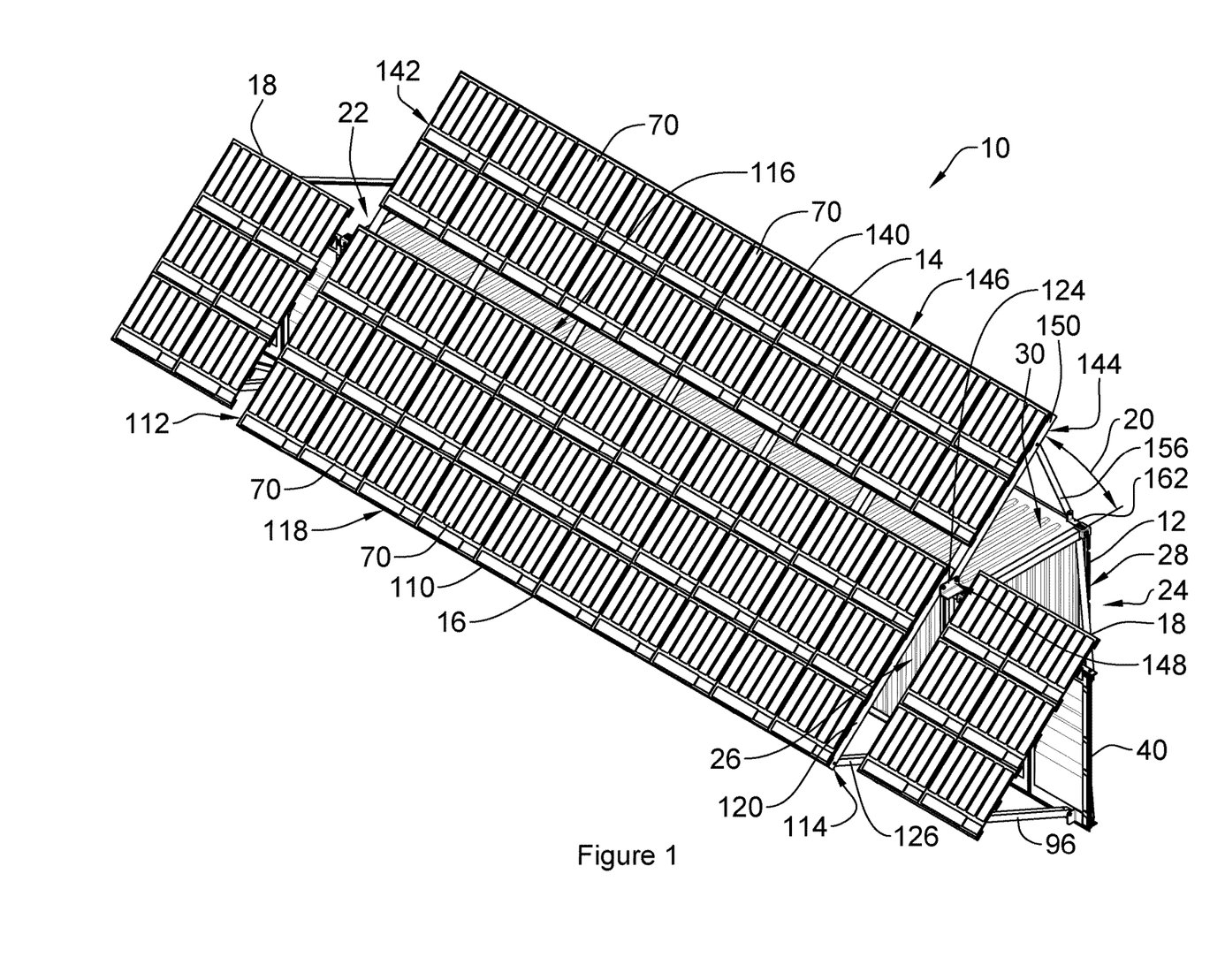
FIG. 1 is a front perspective view of an apparatus for portable power generation according to a first embodiment of the present invention, with the solar panels in a deployed position.
Figure 2:
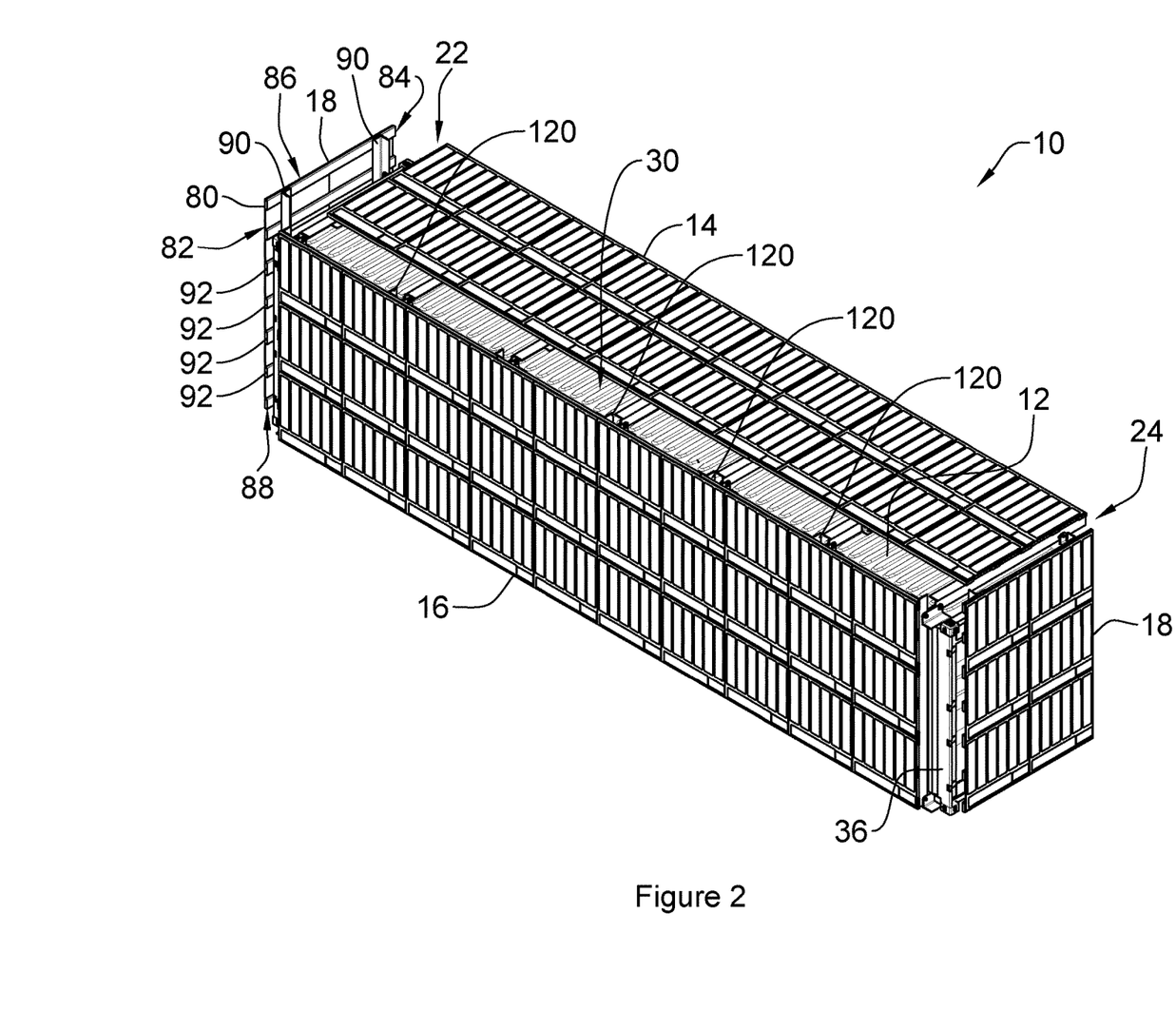
FIG. 2 is a front perspective view of the apparatus of FIG. 1, with the solar panels in a stored position.

Referring to FIGS. 1 and 2, an apparatus for portable power generation according to a first embodiment of the invention is shown generally at 10. The apparatus 10 is comprised of a standard intermodal container 12 with top, front and end solar panels, 14, 16 and 18, respectively, pivotably secured thereto, as will be set out below. The solar panels, 14, 16 and 18, may be positioned in a stored position for storage or transportation, as illustrated in FIG. 2, or in a deployed position, as illustrated in FIG. 1, with the solar panels 14, 16 and 18 aligned and positioned with a tilt angle 20 from horizontal.

Figure 3:
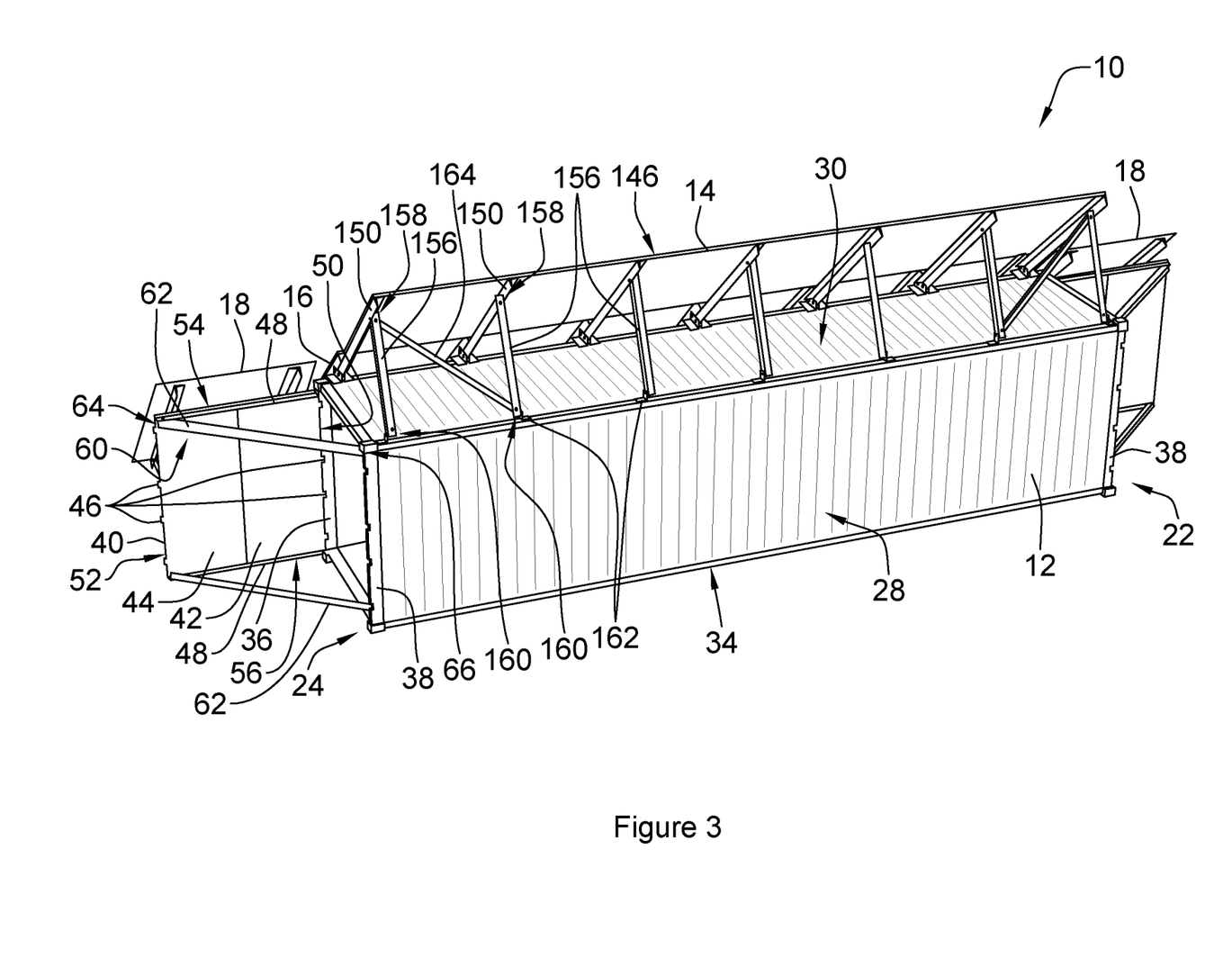
FIG. 3 is a rear perspective view of the apparatus of FIG. 1, in the deployed position.

Referring now to FIGS. 1 through 3 the container 12 extends between first and second ends, 22 and 24, respectively and includes a front 26, rear 28, top 30 and bottom 34. At each of the first and second ends, 22 and 24, front and rear corner posts, 36 and 38, respectively, extend between the top 30 and bottom 34, respectively at the front 26 and rear 28, as is commonly known in the art and best illustrated in FIGS. 3 and 6. At each end, 22 and 24, a door 40 is hingedly secured to the front corner post 36.

Figure 4:
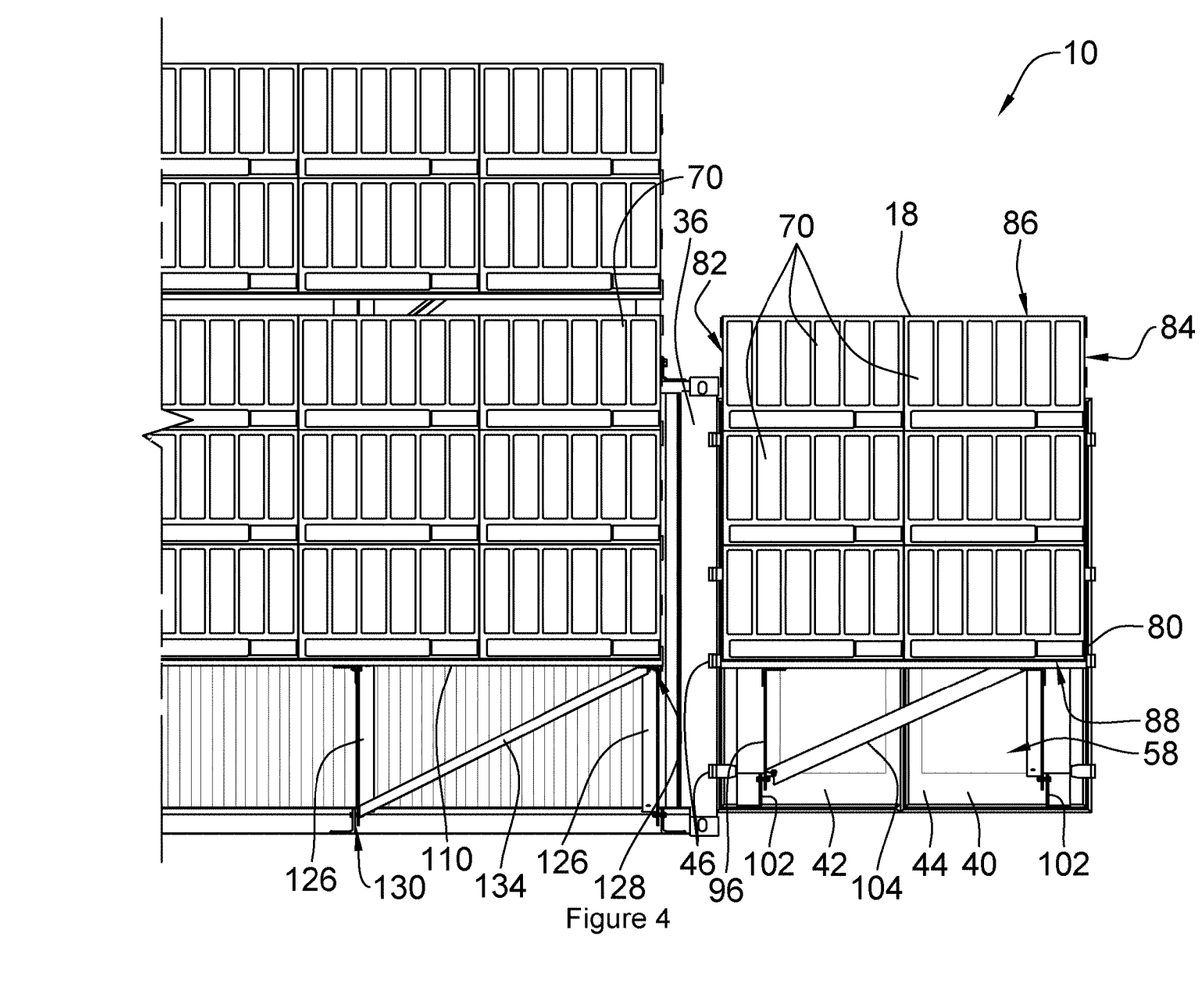
FIG. 4 is a front view at the second end of the apparatus, in the deployed position.
Figure 5:
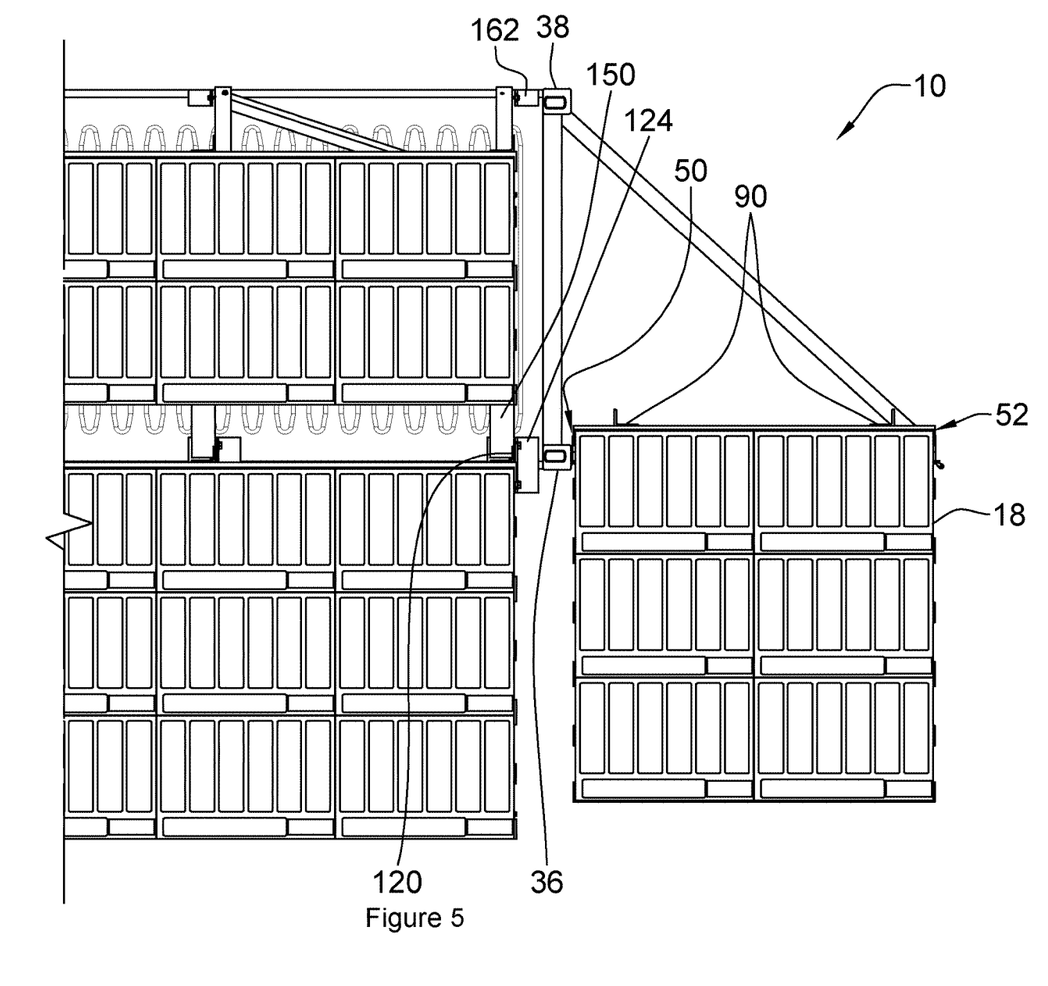
FIG. 5 is a plan view at the second end of the apparatus, in the deployed position.
Figure 6:
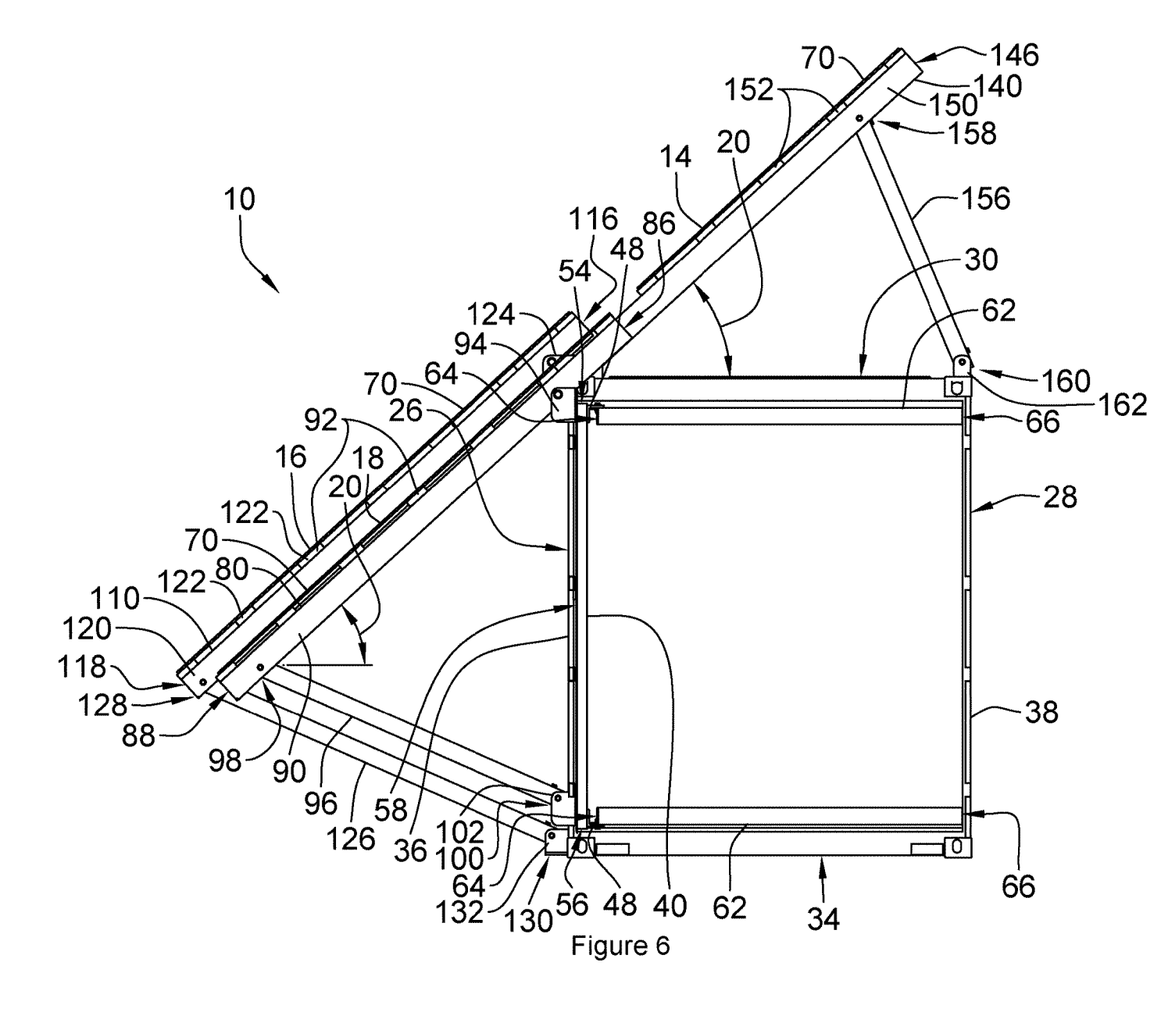
FIG. 6 is a side view at the second end of the apparatus, in the deployed position.

Referring now to FIGS. 3 through 6, each door 40 extends between door front and door rear edges, 50 and 52, respectively, and between door top and door bottom edges, 54 and 56, respectively, and includes front and rear surfaces, 58 and 60, respectively. On a standard container 12, the door 40 is comprised of front and rear doors, 42 and 44, respectively, with the front door 42 extending from the door front edge 50 and the rear door 44 extending from the door rear edge 52. Each door 42 and 44 includes a plurality of hinges 46 used to join each door, 42 and 44, to the container 12 at the front and rear corner posts, 36 and 38. To configure the apparatus 10 such that there is one door 40 at each end, 22 and 24, the front and rear doors 42 and 44 are secured together with at least one rigid elongate member 48 extending between the door front and door rear edges, 50 and 52 on the rear surface 60. As illustrated in FIGS. 3 and 6, the elongate members 48 may be located proximate to the door top and door bottom edges, 54 and 56. The elongate members 48 may be such as, by way of non-limiting example, angle iron or wood boards. It will be appreciated that the two doors 42 and 44 may be secured together by any known means, such as, by way of non-limiting example, welding or fasteners. Hinge pins (not shown) are removed from the plurality of hinges 46 joining the rear door 44 to the rear corner post 38 at the door rear edge 52 such that the joined door 40 pivots about the hinges 46 secured to the front corner post 36 at the door front edge 50.

At least one door support strut 62 extends between the door 40 and the container 12. Each door support strut 62 extends between first and second ends, 64 and 66, respectively. The first end 64 of the door support strut 62 is pivotably secured to the door 40 at the rear surface 60 proximate to the door rear edge 52 and extends to the rear corner post 38 when the door 40 is in the open position, as best illustrated in FIG. 3. As illustrated in FIG. 6, each door support strut 62 may be pivotably secured to the elongate member 48 at the first end 64. The second end 66 may be secured to the rear corner post 38 by any known means, such as, by way of non-limiting example, a fastener secured to a bracket. The length of each door support strut 62 is selected such that each door 40 is maintained in a position aligned with the front 26 of the container 12 when secured in the open position.

Each end solar panel 18 is comprised of a plurality of solar cells 70 secured on a door mounting assembly 80. The door mounting assembly 80 extends between first and second edges, 82 and 84, respectively, and between top and bottom edges 86 and 88, respectively. As best seen on FIG. 2, each door mounting assembly 80 includes a pair of elongate vertical support members 90 extending between the top and bottom edges, 86 and 88, with a plurality of elongate horizontal support members 92 extending between the first and second edges, 82 and 84, mounted on the vertical support members 90 to form a frame onto which the solar cells 70 are secured. The vertical support members 90 may be formed using such as, by way of non-limiting example, angle iron. The horizontal support members 92 may be formed using such wood or composite boards. As illustrated in FIG. 6, each vertical support member 90 is pivotably mounted to a door support top bracket 94 secured to the font surface 58 of the door 40 proximate to the door top edge 54. The door support top bracket 94 extends past the door top edge 54 allowing the door mounting assembly 80 to pivot thereabove. A door support brace 96, which extends between first and second ends, 98 and 100, respectively, is pivotably secured proximate to the first end 98 to each vertical support member 90 proximate to the bottom edge 88. The second end 100 of each door support brace 96 may be selectively secured to a corresponding door support bottom bracket 102 secured to the front surface 58 of the door 40 proximate to the door bottom edge 56. As illustrated in FIG. 4, a door cross brace 104 extends between the door support braces 96, secured proximate to the first end 98 on one door support brace 96 and proximate to the second end 100 on the other door support brace 96. The length of the door support braces 96 is selected such that the end solar panel 18 is positioned at a tilt angle 20 from horizontal when secured in the deployed position, as illustrated in FIG. 6. The tilt angle 20 is selected dependent on the latitude of the installation location of the apparatus 10, as is commonly known in the art, and may be such as, by way of non-limiting example, in the range of 0 to 90 degrees.

The front solar panel 16 is formed in a similar manner to the end solar panels 18, and includes a plurality of solar cells 70 secured on a front mounting assembly 110. Referring to FIGS. 1 and 6, the front mounting assembly 110 extends between first and second edges, 112 and 114, respectively, and between top and bottom edges 116 and 118, respectively. Each front mounting assembly 110 includes a plurality of elongate vertical support members 120 extending between the top and bottom edges, 116 and 118, with a plurality of elongate horizontal support members 122 extending between the first and second edges, 112 and 114, mounted on the vertical support members 120 to form a frame onto which the solar cells 70 are secured. The vertical support members 120 may be formed using such as, by way of non-limiting example, angle iron. The horizontal support members 122 may be formed using such as, by way of non-limiting example, wood or composite boards. As illustrated in FIGS. 1, 5 and 6, each vertical support member 120 is pivotably mounted to a top support bracket 124 secured to the top 30 of the container 12 proximate to, and extending past, the front 26. The top support bracket 124 extends past the front 26 allowing the front mounting assembly 110 to pivot over the top 30. A front support brace 126, which extends between first and second ends, 128 and 130, respectively, is pivotally secured proximate to the first end 128 to each vertical support member 120 proximate to the bottom edge 118. The second end 130 of each front support brace 126 may be selectively secured to a corresponding front support bottom bracket 132 secured to the front 26 of the container 12 proximate to the bottom 34. As illustrated in FIG. 4, a front cross brace 134 extends between the front support braces 126, secured proximate to the first end 128 on one front support brace 126 and proximate to the second end 130 on another front support brace 126. The length of the front support braces 126 is selected such that the front solar panel 16 is positioned at the tilt angle 20 from horizontal when secured in the deployed position, as illustrated in FIG. 6, and as set out above.

The front solar panel 16 includes a plurality of solar cells 70 secured on a top mounting assembly 140. Referring to FIGS. 1 and 6, the top mounting assembly 140 extends between first and second edges, 142 and 144, respectively, and between top and bottom edges 146 and 148, respectively. Each top mounting assembly 140 includes a plurality of elongate vertical support members 150 extending between the top and bottom edges, 146 and 148, with a plurality of elongate horizontal support members 152 extending between the first and second edges, 142 and 144, mounted on the vertical support members 150 to form a frame onto which the solar cells 70 are secured. As best illustrated in FIGS. 1 and 2, the horizontal support members 152 and solar cells 70 are mounted to a portion of the vertical support members 150 extending from the top edge 146, with a portion of the vertical support members 150 exposed proximate to the bottom edge 148. The vertical support members 150 may be formed using such as, by way of non-limiting example, angle iron. The horizontal support members 152 may be formed using such as, by way of non-limiting example, wood or composite boards. As illustrated in FIGS. 1 and 5, each vertical support member 150 is pivotably mounted to the top support bracket 124. A top support brace 156, which extends between first and second ends, 158 and 160, respectively, is pivotably secured proximate to the first end 158 to each vertical support member 150 proximate to the top edge 146. The second end 160 of each top support brace 156 may be selectively secured to a corresponding top rear support bracket 162 secured to the top 30 of the container 12 proximate to the rear 28, as illustrated in FIGS. 3 and 6. As illustrated in FIG. 3, a top cross brace 164 extends between the top support braces 156, secured proximate to the first end 158 on one top support brace 156 and proximate to the second end 160 on another top support brace 156. The length of the top support braces 156 is selected such that the top solar panel 14 is positioned at the tilt angle 20 from horizontal when secured in the deployed position, as illustrated in FIG. 6, and as set out above.

To position the apparatus 10 in the deployed position, as illustrated in FIG. 1, the apparatus 10 is transported to the desired site in the stored position, as illustrated in FIG. 2. As is commonly known in the art, the front 26 is positioned to face true south when located in the northern hemisphere, or true north when located in the southern hemisphere. The doors 40 are then pivoted about the hinges 46 on the front corner posts 36 such that the doors 40 are aligned parallel to the front 26. The second end 66 of the door support struts 62 are then secured to the rear corner posts 38 to maintain the doors 40 in the open position. The top solar panel 14 is pivoted up from the top 30 and the top support braces 156 are secured to the top rear support brackets 162. The front solar panel 16 is pivoted out from the front 26 and the front support braces 126 are secured to the front support bottom brackets 132. The end solar panels 18 are pivoted out from the doors 40 and the door support braces 96 are secured to the door support bottom brackets 102.

Figure 7:
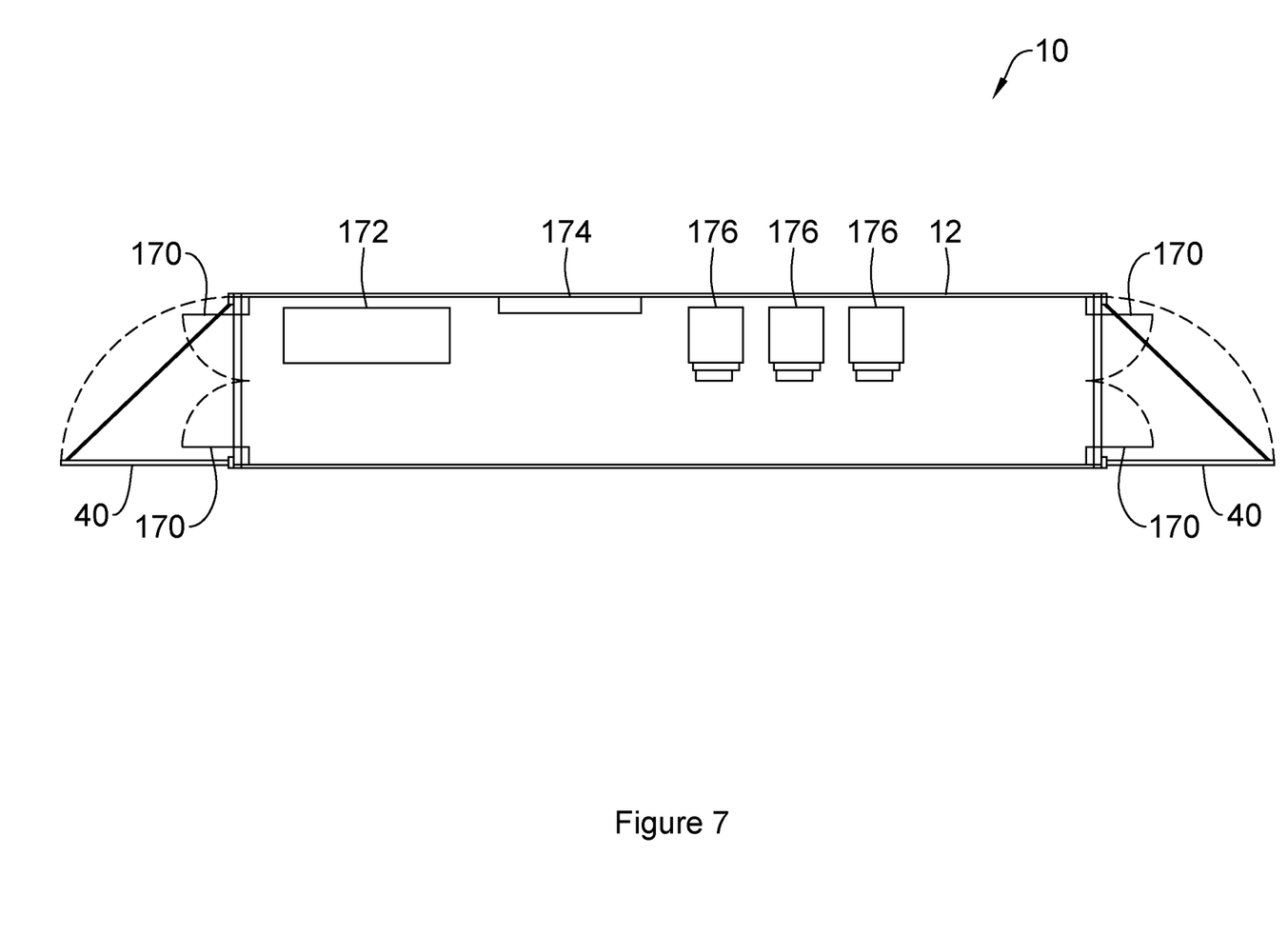
FIG. 7 is a plan diagram of the apparatus, with a sample interior layout.

Turning now to FIG. 7, a sample interior layout of the container 12 is illustrated. The container 12 may be equipped with additional doors 170 to secure the interior of the container 12. A backup generator 172 may be included, as well as inverters 174 to convert the DC output of the solar cells 70 or the generator 172 to AC for use by field equipment. A plurality of cabinets 176 may be used to store equipment or batteries. It will be appreciated that other configurations may be useful, as well.

While specific embodiments of the invention have been described and illustrated, such embodiments should be considered illustrative of the invention only and not as limiting the invention as construed in accordance with the accompanying claims.

What is claimed is:

1. An apparatus for portable power generation comprising:
   an intermodal container having a front, a rear, a top and a bottom and extending between first and second ends, said intermodal container having a front bracket secured to a top of the intermodal container and a top bracket secured to a top of the intermodal container;
   at least one front solar panel assembly hinged to the top bracket, wherein the at least one front solar panel assembly is pivotable between a stored position proximate to and substantially parallel to an outside surface of the front of the intermodal container and an extended position angularly rotated upward about the top bracket to an angle relative to the front of the intermodal container; and
   at least one top solar panel assembly hinged to the top bracket wherein the at least one top solar panel assembly is pivotable between a stored position proximate to and substantially parallel to an outside surface of the top of the intermodal container and an extended position angularly rotated upward about the top bracket to an angle relative to the top of the intermodal container.

2. The apparatus of claim 1 wherein the front solar panel assembly is supported at the extended position by at least one front support brace.

3. The apparatus of claim 2 wherein the at least one front support brace extends between the at least one front solar panel and the front of the intermodal container.

4. The apparatus of claim 2 wherein the at least one front support brace extends to a bottom portion of the at least one front solar panel.

5. The apparatus of claim 2 wherein the at least one front support brace is secured to the at least one front solar panel by fasteners.

6. The apparatus of claim 1 wherein the top bracket extends past the front of the intermodal container.

7. The apparatus of claim 1 wherein the top solar panel assembly is supported at the extended position by at least one top support brace.

8. The apparatus of claim 7 wherein the at least one top support brace extends between the at least one top solar panel and the top of the intermodal container.

9. The apparatus of claim 7 wherein the at least one top support brace extends to a top portion of the at least one top solar panel.

10. The apparatus of claim 7 wherein the at least one top support brace is secured to the at least one top solar panel by fasteners.

11. The apparatus of claim 1 wherein the at least one front solar panel assembly and the at least one top solar panel assembly are substantially parallel at the extended position.

12. The apparatus of claim 1 wherein the top bracket and the front bracket are connected to each other.

13. A method for portable power generation comprising:
locating an intermodal container at a desired location;
pivoting at least one front solar panel assembly about a front bracket secured to an outside surface of a top of the intermodal container into an extended position angular relative to the front of the intermodal container; and
pivoting at least one top solar panel assembly about a top bracket secured to an outside surface of a top of the intermodal container into an extended position angular relative to the top of the intermodal container.

14. The method of claim 13 wherein the extended positions of the at least one front solar panel assembly and the at least one top solar panel assembly are substantially parallel.

15. The method of claim 13 further comprising securing the at least one front solar panel assembly at the extended position with at least one front strut extending between the at least one front solar panel assembly and the front of the intermodal container.

16. The method of claim 13 further comprising securing the at least one top solar panel assembly at the extended position with at least one top strut extending between the at least one top solar panel assembly and the top of the intermodal container.

17. An apparatus for portable power generation comprising:
an intermodal container having a front, a rear, a top and a bottom and extending between first and second ends;
at least one front solar panel assembly pivotably connected to the intermodal container proximate to an edge defined between the top and front of the intermodal container so as to be rotatable between a stored position proximate to and substantially parallel to an outside surface of the front of the intermodal container and an extended position angularly rotated upward to an angle relative to the front of the intermodal container; and
at least one top solar panel assembly pivotally connected to the intermodal container proximate to an edge defined between the top and front of the intermodal container so as to be rotatable between a stored position proximate to and substantially parallel to an outside surface of the top of the intermodal container and an extended position angularly rotated upward to an angle relative to the top of the intermodal container.

* * * * *